United States Patent [19]
Johnson, Jr.

[11] Patent Number: 5,409,324
[45] Date of Patent: Apr. 25, 1995

[54] HIGH STRENGTH, QUICK CONNECT/DISCONNECT COUPLING

[75] Inventor: George P. Johnson, Jr., Tomball, Tex.

[73] Assignee: North Houston Machine, Inc., Tomball, Tex.

[21] Appl. No.: 82,663

[22] Filed: Jun. 25, 1993

[51] Int. Cl.[6] .................. F16L 25/06; F16B 21/12
[52] U.S. Cl. .................... 403/355; 403/378; 403/318; 285/86; 285/330
[58] Field of Search .............. 403/355, 378, 377, 376, 403/318, 316, 315; 285/81, 84, 86, 330, 328, 421, 305

[56] References Cited
U.S. PATENT DOCUMENTS

| | | | |
|---|---|---|---|
| 573,695 | 12/1896 | Penfield | 285/421 |
| 688,860 | 12/1901 | Kay et al. | 403/355 |
| 774,398 | 11/1904 | Reine . | |
| 1,692,565 | 11/1928 | Paul . | |
| 2,032,491 | 3/1936 | Moreland . | |
| 2,756,022 | 7/1956 | Sturegon . | |
| 2,795,398 | 6/1957 | Ragland . | |
| 3,215,974 | 11/1965 | Wooding . | |
| 3,301,009 | 1/1967 | Coulter, Jr. . | |
| 3,315,993 | 4/1967 | Church . | |
| 3,433,512 | 3/1969 | Kraft . | |
| 3,574,359 | 4/1971 | Klein | 285/86 |
| 4,192,155 | 3/1980 | Gray . | |
| 4,288,172 | 9/1981 | Livesay et al. . | |
| 4,311,224 | 1/1982 | Kato et al. . | |
| 4,433,861 | 2/1984 | Kreczik | 285/305 |
| 4,448,564 | 5/1984 | Orszulak | 403/318 |
| 4,485,880 | 12/1984 | Makohl . | |
| 4,519,638 | 5/1985 | Yodoshi et al. | 285/305 |
| 4,557,508 | 12/1985 | Walker | 285/84 |
| 4,759,738 | 7/1988 | Johnson . | |
| 4,893,962 | 1/1990 | Komeyama . | |

*Primary Examiner*—Randolph A. Reese
*Assistant Examiner*—Anthony Knight
*Attorney, Agent, or Firm*—Pravel, Hewitt, Kimball & Krieger

[57] ABSTRACT

A coupling for transferring torque and axial force from a first member to a second member. The coupling includes a first cylindrical member having an outer peripheral surface and an end portion and a second cylindrical member having a receiving end portion. The receiving end portion has an end face with a longitudinal bore in the receiving end portion for receiving the end portion of the first cylindrical member. The end portion of the first cylindrical member has a plurality of transverse keyways in the outer peripheral surface. The receiving end portion of the second cylindrical member has a plurality of transverse slots in the receiving end portion corresponding to the plurality of transverse keyways. A key is received in each transverse keyway and protrudes from each transverse keyway into the corresponding transverse slot. A retainer ring has a bore such that the retainer ring extends over the plurality of transverse slots of the receiving end portion of the second cylindrical member. The keys axially and non-rotatably connect the first member to the second member.

13 Claims, 3 Drawing Sheets

HIGH STRENGTH, QUICK CONNECT/DISCONNECT COUPLING

BACKGROUND OF THE INVENTION

1. Field of the Invention

The present invention relates to a high strength coupling which transfers axial force and torque from one member to another via a key and keyway arrangement.

2. Description of the Prior Art

Many types of couplings have been used to connect one cylindrical member to another. In many instances, it is necessary to transfer axial force and torque from one shaft or pipe member to a second shaft or pipe member. Oftentimes, it is desirable that the coupling be easy to connect and disconnect which eliminates connecting the members by a permanent means such as welding.

Threaded couplings have been used to provide a quick connect/disconnect coupling. Threaded couplings transfer axial compressive and tensile forces and torque in one direction about the longitudinal axis. Threaded couplings have the disadvantage in that the threaded coupling will not take high torque loads in both the clockwise and counter-clockwise directions due to the threaded make-up of the coupling. Furthermore, the threaded coupling is extremely difficult to disconnect after prolonged periods of torque transfer due to the frictional engagement of the threads. Threaded couplings are also subject to damaged threads and cross-threading during the coupling make-up which can result in the replacement of the coupling member.

Various arrangements of keys and keyways have been used to form axial load and torque transferring couplings as, for example, shown in U.S. Pat. Nos. 4,893,962, 3,433,512, 3,315,993, 2,756,022, and 2,032,491. Typically, in key/keyway couplings, the key is subjected to shear stress both by the torque and the axial load. Shear stress is directly proportional to the cross-sectional area of the key in shear. The maximum design rating for the coupling is often limited by the shear stress of the key.

It is desirable to have a high strength coupling which can transfer both axial tensile and compressive forces and torque in both directions around the longitudinal axis of the connected members. The high strength coupling should be of simple construction, low cost and quick to connect and disconnect.

SUMMARY OF THE PRESENT INVENTION

The present invention is a high strength coupling which can transfer both axial tensile and compressive forces and torque in both directions around the longitudinal axis of the connected members. The coupling is simple in construction, economical, compact and easy to assemble and disassemble. The coupling can be quickly and easily connected and disconnected.

The high strength coupling of the present invention transfers torque and axial force from a first member to a second member. The coupling includes a first cylindrical member having an outer peripheral surface and an end portion and a second cylindrical member having a receiving end portion. The receiving end portion has an end face with a longitudinal bore therein for receiving the end portion of the first cylindrical member. The end portion of the first cylindrical member has a plurality of transverse keyways in the outer peripheral surface. The receiving end portion of the second cylindrical member has a plurality of transverse slots therein corresponding to the plurality of transverse keyways. A key is received in each transverse keyway and protrudes therefrom into the corresponding transverse slot. A retainer ring has a bore therethrough such that the retainer ring extends over the plurality of transverse slots of the receiving end portion of the second cylindrical member. The keys axially and non-rotatably connect the first member to the second member and provide a high strength coupling. Torsional forces radially force the keys against the retainer ring. The retainer ring counteracts the torsional forces and results in an extremely high strength coupling.

BRIEF DESCRIPTION OF THE DRAWINGS

In order to more fully understand the drawings referred to in the detailed description of the present invention, a brief description of each drawing is presented, in which.

DETAILED DESCRIPTION OF THE INVENTION

Figure 1:
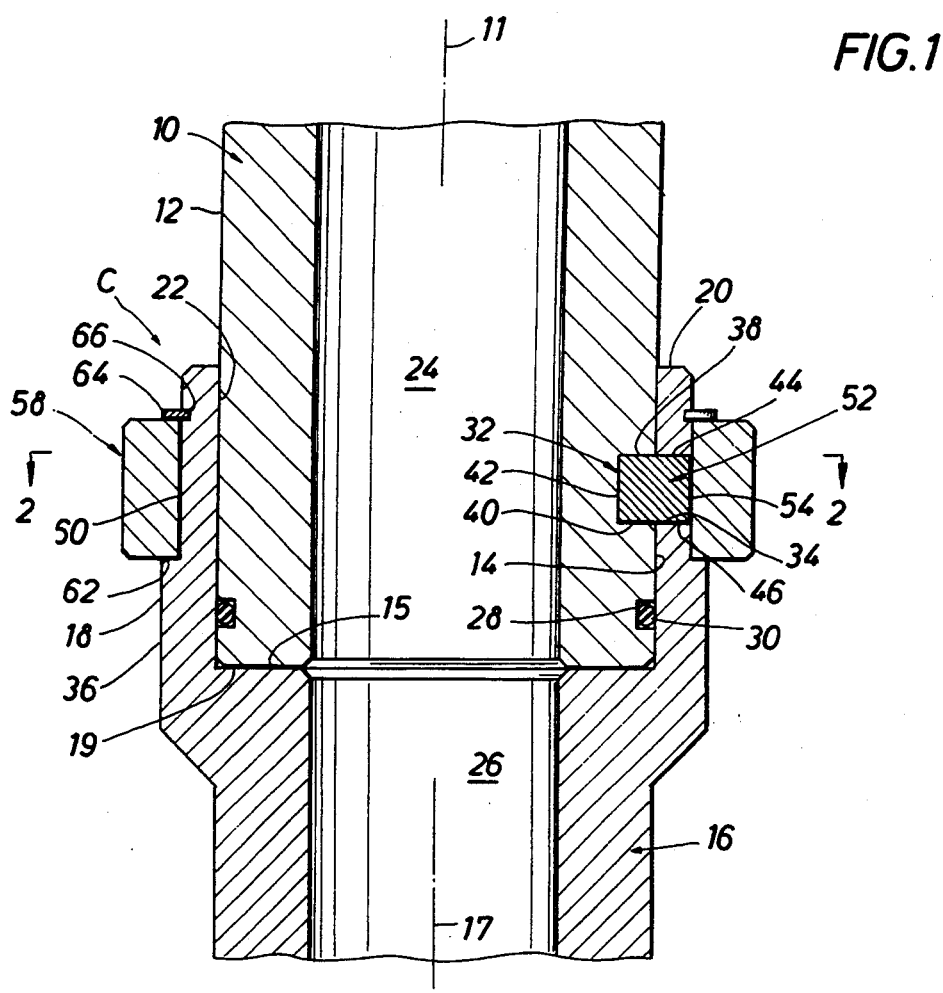
FIG. 1 is a cross-sectional view of the high strength coupling according to the preferred embodiment of the present invention.

Referring now to the drawings in greater detail, the high strength coupling of the present invention, generally designated by the letter C, comprises a first cylindrical member 10 having an outer peripheral surface 12 and an end portion 14 with an end face 15. The coupling C includes a second cylindrical member 16 having a receiving end portion 18. Referring to FIG. 1, the receiving end portion 18 has an end face 20 with a longitudinal bore 22 therein for receiving the end portion 14 of the first cylindrical member 10. The receiving end portion 18 includes an internal shoulder 19 at the inner end of the longitudinal bore 22. The first cylindrical member 10 has a longitudinal axis 11 and the second cylindrical member 16 has a longitudinal axis 17 as shown in FIG. 1.

For purposes of illustration, the first and second members 10 and 16, respectively, have been shown as having a longitudinal bore 24 and 26, respectively, therethrough which are in axial alignment and form a continuous throughbore in the coupled configuration as shown in FIG. 1. A circumferential groove 28 in the peripheral surface 12 of the end portion 14 of the first member 10 receives a seal means 30, as for example an 0-ring, to provide a fluid-tight seal between the first and second members 10 and 16, respectively. Alternatively, the circumferential groove 28 and the seal means 30 could be included in either the end face 15 of the first cylindrical member 10 or the shoulder 19 of the second cylindrical member 16. It is to be understood that the first and second members 10 and 16, respectively, could also be solid members with no throughbores 24 and 26, respectively, such as shafts. In such a case, the circumferential groove 28 and seal means 30 would not be necessary.

Figure 2:
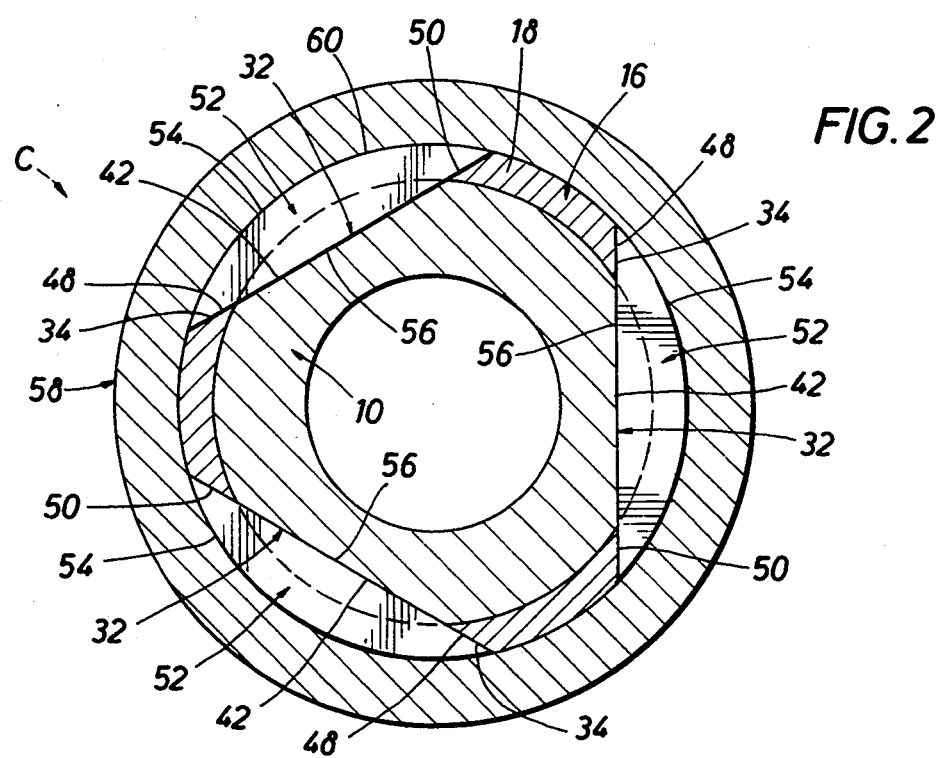
FIG. 2 is a view taken along line 2—2 of FIG. 1.

Referring to FIGS. 1 and 2, the end portion 14 of the first cylindrical member 10 has a plurality of transverse keyways 32 in the outer peripheral surface 12. Each keyway 32 includes a pair of parallel side surfaces 38 and 40 and a bottom surface 42 therebetween. Preferably, the bottom surface 42 is parallel to a plane tangential to the outer peripheral surface 12 of the first cylindrical member 10. Due to the curvature of the outer peripheral surface 12 of the first cylindrical member 10, each keyway 32 gradually decreases in depth from its middle to its ends where it merges into the outer peripheral surface 12 of the first member 10.

Figure 4:
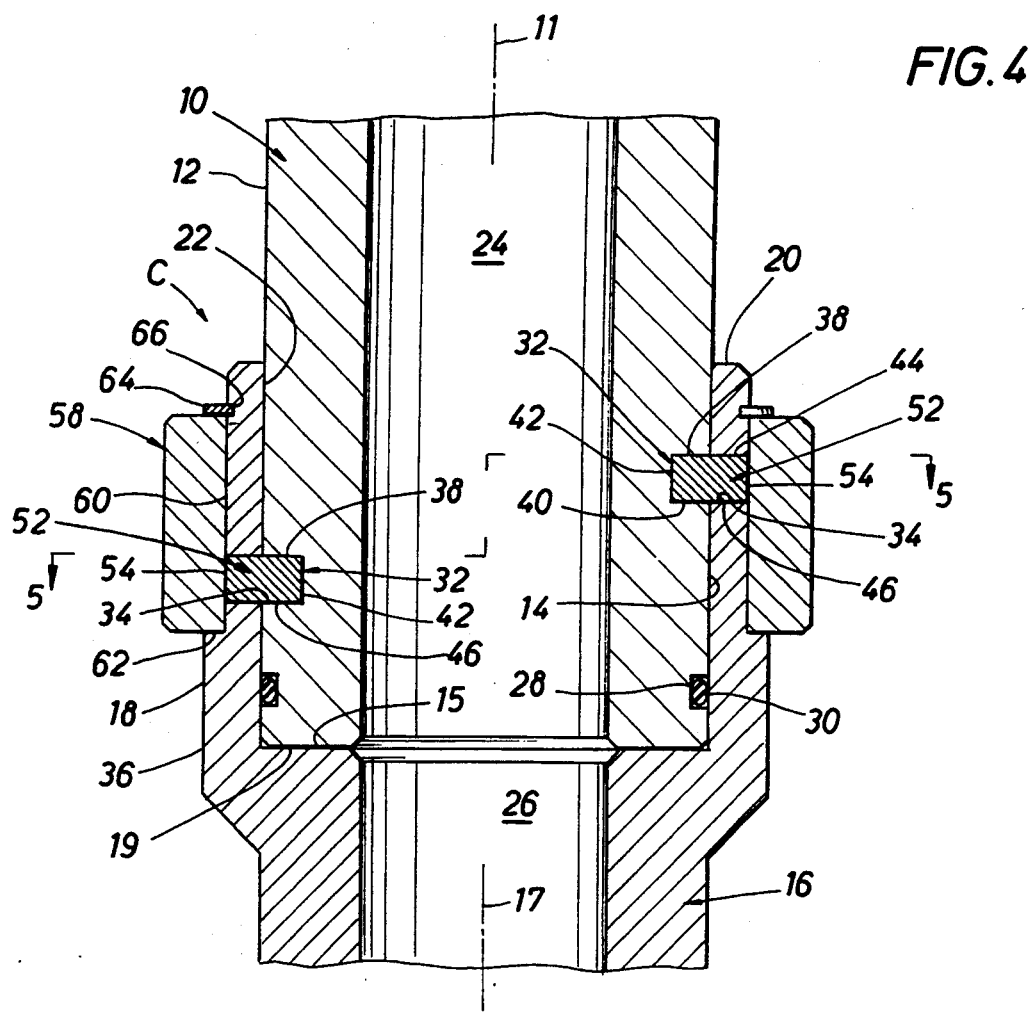
FIG. 4 is an elevational view in cross-section of the high strength coupling according to a third embodiment of the present invention.
Figure 5:
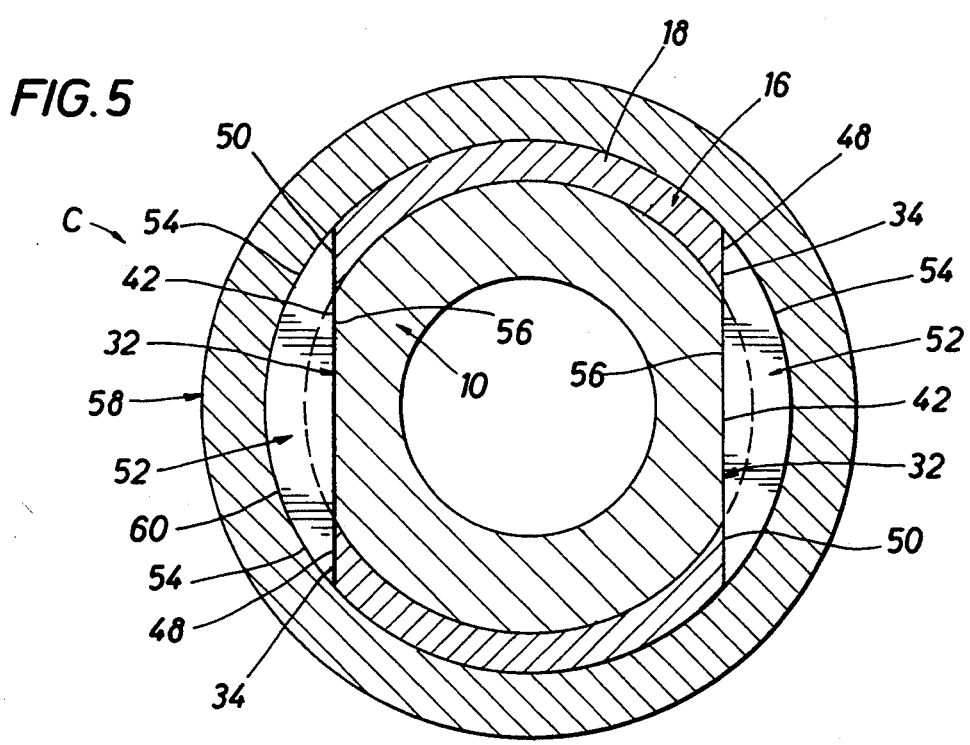
FIG. 5 is a view taken along line 5—5 of FIG. 4.

In the embodiment shown in FIGS. 1 and 2, the first cylindrical member 10 is shown as having three transverse keyways 32 which are equidistantly spaced from one another in a common plane transverse to the longitudinal axis 11. It is to be understood that the coupling C can have one or more transverse keyways 32 although three is preferable in a common plane. If the coupling C has two transverse keyways 32, the transverse keyways 32 should be displaced 180° from each other. Referring to FIGS. 4 and 5, the transverse keyways 32 could be equidistantly spaced about the longitudinal axis 11 in separate parallel planes. This "staggered" configuration would serve to further improve the stress characteristics of the first cylindrical member 10. Alternatively, two or more sets of a plurality of transverse keyways 32 could be placed in two parallel planes. The exact configuration to use will depend on various design, manufacturing and economic parameters.

As shown in FIGS. 1 and 2, the receiving end portion 18 of the second cylindrical member 16 has a cylindrical outer surface 36 and a plurality of transverse slots 34 therein. Each transverse slot 34 includes a pair of parallel side walls 44 and 46 and a pair of end walls 48 and 50 therebetween. The pair of end walls 48 and 50 are in generally planer alignment with the bottom surface 42 of the corresponding transverse keyway 32. The number of transverse slots 34 corresponds to the number of transverse keyways 32.

A key 52 is received in each transverse keyway 32 and protrudes therefrom into the corresponding transverse slot 34. Each key 52 has an arcuate surface 54 corresponding to the cylindrical outer surface 36 of the receiving end portion 18 of the second cylindrical member 16 and a substantially planer surface 56 having a length of approximately the distance between the corresponding pair of end walls 48 and 50 at the cylindrical outer surface 36. Each key 52 has a thickness approximating the distance between the pair of parallel side walls 44 and 46 of the corresponding transverse slot 34. Typically, the distance between the corresponding pair of parallel side surfaces 38 and 40 of the transverse keyway 32 approximates the thickness of the key 52.

Typically, it may be desirable to have the end face 15 of the first cylindrical member 10 in substantially abutting contact with the shoulder 19 of the second cylindrical member 16 to lessen or eliminate the shear stress in the keys 52 when the coupling C is subjected to compressive axial loading.

Figure 3:
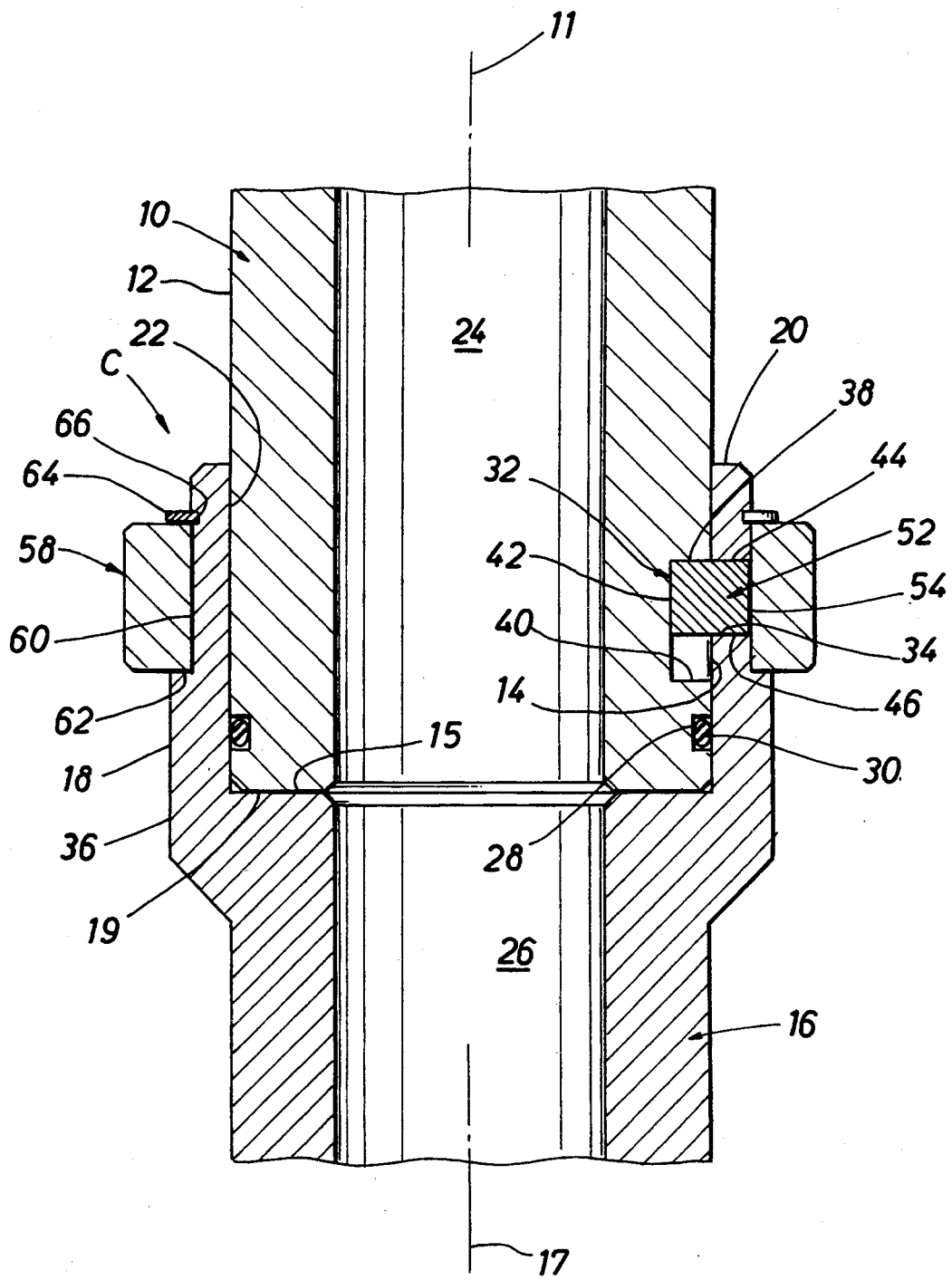
FIG. 3 is an elevational view in cross-section of the high strength coupling according to a second embodiment of the present invention.

In some instances, it may be desirable to have a coupling C which, in addition to transferring axial loads and torque, will also allow a generally small amount of axial movement of the first and second members 10 and 16, respectively, relative to one another. One such example is a shock absorber coupling for a rotary drill stem as described in U.S. Pat. No. 2,756,022. In the present invention, relative axial movement between the first and second members 10 and 16, respectively, can be accomplished by increasing the distance between the pair of parallel side surfaces 38 and 40 of the transverse keyway 32 as shown in FIG. 3. The keys 52 will remain in place by the surface contact with the bottom surface 42 of the transverse keyway 32, the transverse slot side walls 44 and 46, and a retainer ring 58 as described below.

The retainer ring 58 has a bore 60 therethrough such that the retainer ring 58 extends over the plurality of transverse slots 34 of the receiving end portion 18 of the second cylindrical member 16. The diameter of the bore 60 generally corresponds to the outer diameter of the receiving end portion 18 proximate to the transverse slots 34. The retainer ring 58 can be maintained in position over the transverse slots 34 in various ways. FIG. 1 shows the cylindrical outer surface 36 of the receiving end portion 18 having a shoulder 62 abutting the retainer ring 58 and a ring 64, such as a snap ring, inserted in an outer groove 66 to limit the movement of the retainer ring 58 in the longitudinal direction. Alternatively, the retainer ring 58 could be maintained in position by one or more set screws (not shown) extending through the side of the retainer ring 58 into a threaded bore (not shown) in the receiving end portion 18 of the second member 16.

The retainer ring 58 maintains the keys 52 in the transverse slots 34 and the transverse keyways 32 and between the bottom surface 42 of the transverse keyway 32 and the retainer ring 58.

The high strength coupling C is assembled by installing the snap ring 64 and the retainer ring 58 over the end portion 14 of the first cylindrical member 10 and then inserting the end portion 14 of the first cylindrical member 10 into the receiving end portion 18 of the second cylindrical member 16. The transverse keyways 32 are aligned with the transverse slots 34. The keys 52 are inserted through the transverse slots 34 until the planer surface 56 of the keys 52 contacts the bottom surface 42 of the transverse keyways 32 and the pair of end walls 48 and 50 of the transverse slots 34. When the keys 52 are installed, the arcuate surface 54 of the key 52 is substantially flush with the adjacent cylindrical outer surface 36 of the receiving end portion 18 of the second cylindrical member 16 as shown in the drawings. The retainer ring 58 is slid onto the receiving end portion 18 of the second cylindrical member 16 and over the transverse slots 34 and keys 52. The retainer ring 58 abuts the shoulder 62 and the snap ring 64 is installed in the outer groove 66. The keys axially and non-rotatably connect the first member to the second member and provide a high strength coupling.

In the preferred embodiment, the keys 52 freely slide through the transverse slots 34 and into the transverse keyways 32 so that upon assembly and disassembly of the coupling C the keys 52 are easily installed and removed, respectively.

In use, upon rotational force being applied to the first cylindrical member 10, the bottom surface 42 of the transverse keyways 32 attempts to rotate the keys 52. For exemplary purposes, the rotational force shall be assumed to be applied in a clockwise direction. Assuming that the second cylindrical member 16 does not freely rotate, the keys 52 are resisted by the end walls 50 of the transverse slots 34. The rotational force radially forces the keys 52 against the retainer ring 58. The retainer ring 58 counteracts the outward radial force of the keys 52 and distributes the torque load among the coupling components which results in an extremely high strength coupling. The retainer ring 58 is subjected to radial tensile force by the keys 52. The thickness of the retainer ring 58 can be designed to counteract the radial tensile forces expected to be experienced by the coupling C to prevent shear failure of the retainer ring 58. The keys 52 are subjected to shear stress by the applied axial load. The dashed line in FIG. 2 coincides with a shear line in the keys 52 under axial loading of the coupling C.

The high strength coupling C of the present invention uniquely distributes the torque load. The high strength coupling C is highly efficient and allows greater torque transmission than typical key/keyway couplings. The high strength coupling C provides perfect alignment of the members 10 and 16, requires no threaded connection, and is quick and easy to assemble and disassemble.

The high strength coupling C can be used in a wide variety of applications in which torque and/or axial loads are to be transferred from one member to another. For example, the high strength coupling C can be used for drive shaft couplings, automatic break-outs, shock subs, saver subs, pull swivels and tool joints, just to name a few.

The foregoing disclosure and description of the invention is illustrative and explanatory thereof, and various changes in the size, shape, and materials, as well as in the details of illustrative construction and assembly, may be made without departing from the spirit of the invention.

I claim:

1. A coupling for transferring torque comprising:
   a first rotatable cylindrical member having a longitudinal axis, an outer peripheral surface and an end portion;
   a second rotatable cylindrical member having a receiving end portion, said receiving end portion having an end face with a longitudinal bore therein for receiving said end portion of said first rotatable cylindrical member and said receiving end portion having a cylindrical outer surface;
   said end portion of said first rotatable cylindrical member having a transverse keyway in said outer peripheral surface, said transverse keyway comprises:
      a pair of parallel side surfaces transverse to the longitudinal axis; and
      a bottom surface between said pair of parallel side surfaces, said bottom surface parallel to a tangent of said first rotatable cylindrical member;
   said receiving end portion of said second rotatable cylindrical member having a transverse slot therein; and
   a key received in said transverse keyway and protruding therefrom into said transverse slot, said key having an arcuate surface corresponding to the cylindrical outer surface of said receiving end portion,
   wherein said key non-rotatably connects said first rotatable cylindrical member to said second rotatable cylindrical member,
   wherein said second rotatable cylindrical member has a longitudinal axis in axial alignment with the longitudinal axis of said first rotatable cylindrical member and said transverse slot comprises:
      a pair of parallel side walls transverse to the longitudinal axis; and
      a pair of end walls between said pair of parallel side walls, said pair of end walls in planer alignment with said bottom surface of said transverse keyway.

2. The coupling according to claim 1, wherein said key has a thickness of approximately the distance between said pair of parallel side walls of said transverse slot.

3. The coupling according to claim 1, wherein said key has a substantially planer surface having a length of approximately the distance between said pair of end walls at said cylindrical outer surface.

4. The coupling according to claim 1, wherein said key has a planer surface opposite said arcuate surface and said planer surface contacts said bottom surface of said transverse keyway and said pair of end walls of said transverse slot.

5. A coupling for transferring torque and axial force comprising:
   a first rotatable cylindrical member having an outer peripheral surface and an end portion;
   a second rotatable cylindrical member having a receiving end portion, said receiving end portion having an end face with a longitudinal bore therein for receiving said end portion of said first rotatable cylindrical member;
   said end portion of said first rotatable cylindrical member having a plurality of transverse keyways in said outer peripheral surface;
   said receiving end portion of said second rotatable cylindrical member having a plurality of transverse slots therein;
   a plurality of keys wherein one said key is received in one said transverse keyway and protrudes therefrom into one said transverse slot; and
   a retainer ring having a bore therethrough such that said retainer ring freely extends over said keys in said plurality of transverse slots of said receiving end portion of said second rotatable cylindrical member and said keys fit freely between said retainer ring and said transverse keyways,
   wherein said keys axially and non-rotatably connect said first rotatable cylindrical member to said second rotatable cylindrical member,
   wherein said receiving end portion has a cylindrical outer surface and each said key has an arcuate surface corresponding to the cylindrical outer surface of said receiving end portion.

6. The coupling according to claim 5, wherein said first rotatable cylindrical member has a longitudinal axis and each said transverse keyway comprises:
   a pair of parallel side surfaces transverse to the longitudinal axis; and
   a bottom surface between said pair of parallel side surfaces, said bottom surface parallel to a tangent of said first rotatable cylindrical member.

7. The coupling according to claim 6, wherein said second rotatable cylindrical member has a longitudinal axis in axial alignment with the longitudinal axis of said first rotatable cylindrical member and each said transverse slot comprises:
   a pair of parallel side walls transverse to the longitudinal axis; and
   a pair of end walls between said pair of parallel side walls,
   wherein each said pair of end walls are in generally planer alignment with said bottom surface of a corresponding said transverse keyway.

8. The coupling according to claim 7, wherein each said key has a thickness of approximately the distance between said pair of parallel side walls of said corresponding transverse slot.

9. The coupling according to claim 7, wherein each said key has a substantially planer surface having a length of approximately the distance between said corresponding pair of end walls at said cylindrical outer surface.

10. The coupling according to claim 7, wherein said key has a planer surface opposite said arcuate surface and said planer surface contacts said bottom surface of said transverse keyway and said pair of end walls of said transverse slot.

11. The coupling according to claim 6, wherein each said key has a thickness of approximately the distance between said pair of parallel side surfaces of said corresponding transverse keyway.

12. The coupling according to claim 6, wherein each said key has a thickness and the distance between each said pair of parallel side surfaces of said transverse keyways is greater than the thickness of said key to permit axial movement of one said rotatable cylindrical member relative to the other said rotatable cylindrical member.

13. A coupling for transferring torque comprising:
a first rotatable cylindrical member having a longitudinal axis, an outer peripheral surface and an end portion;
a second rotatable cylindrical member having a receiving end portion, said receiving end portion having an end face with a longitudinal bore therein for receiving said end portion of said first rotatable cylindrical member and said receiving end portion having a cylindrical outer surface;
said end portion of said first rotatable cylindrical member having a transverse keyway in said outer peripheral surface, said transverse keyway comprises:
a pair of parallel side surfaces transverse to the longitudinal axis;
a bottom surface between said pair of parallel side surfaces, said bottom surface parallel to a tangent of said first rotatable cylindrical member;
said receiving end portion of said second rotatable cylindrical member having a transverse slot therein; and
a key received in said transverse keyway and protruding therefrom into said transverse slot, said key having an arcuate surface corresponding to the cylindrical outer surface of said receiving end portion,
wherein said key non-rotatably connects said first rotatable cylindrical member to said second rotatable cylindrical member,
wherein said key has a thickness and the distance between said pair of parallel side surfaces of said transverse keyway is greater than the thickness of said key to permit axial movement of one said rotatable cylindrical member relative to the other said rotatable cylindrical member.

* * * * *